United States Patent [19]

Schmidt et al.

[11] Patent Number: 4,774,142

[45] Date of Patent: Sep. 27, 1988

[54] MULTI-LAYER OR LAMINATED COMPOUND BODY, IN PARTICULAR VEHICLE TIRE, AND PROCESS AND COUPLING MASS FOR ITS PRODUCTION

[75] Inventors: Andreas Schmidt, Hainburg/Donau; Oskar Schmidt, Kittsee, both of Austria

[73] Assignee: LIM Kunststoff-Technologie Gesellschaft m.b.H., Kittsee, Austria

[21] Appl. No.: 873,938

[22] Filed: Jun. 13, 1986

[30] Foreign Application Priority Data

Jun. 19, 1985 [AT] Austria ............................... 1824/85

[51] Int. Cl.$^4$ ..................... B32B 27/40; B60C 9/02; C09J 3/14
[52] U.S. Cl. .................. 428/423.3; 152/564; 152/565; 156/123; 156/331.4; 156/331.7; 428/424.2; 428/424.8
[58] Field of Search ............ 428/36, 423.3, 423.9, 428/424.2, 424.8; 156/123, 330.9, 331.1, 331.4, 331.7; 152/564, 565, 367

[56] References Cited

U.S. PATENT DOCUMENTS

| | | | |
|---|---|---|---|
| 3,648,748 | 3/1972 | Lovell | 428/424.2 |
| 3,806,486 | 4/1974 | Endriss et al. | 528/60 |
| 3,880,808 | 4/1975 | Hausch et al. | 156/110 A |
| 3,880,810 | 4/1975 | Hausch et al. | 156/331 |
| 3,916,072 | 10/1975 | Hausch et al. | 428/423 |
| 3,936,576 | 2/1976 | Kay | 152/565 |
| 3,939,294 | 2/1976 | Fieldhouse | 428/424 |
| 4,029,730 | 6/1977 | Schroeder | 152/354 |
| 4,551,517 | 11/1985 | Herold et al. | 156/331.4 |
| 4,552,816 | 11/1985 | Spahic et al. | 428/424.8 |
| 4,669,517 | 6/1987 | Krishnan | 152/564 |

FOREIGN PATENT DOCUMENTS 101660 2/1984 European Pat. Off.
861220 2/1961 United Kingdom.

*Primary Examiner*—John E. Kittle
*Assistant Examiner*—James J. Seidleck
*Attorney, Agent, or Firm*—Panitch Schwarze Jacobs & Nadel

[57] ABSTRACT

The invention relates to a multi-layer or laminated compound body, in particular vehicle tire in which at least one first layer or ply, in particular on polyurethane basis, is bonded via a coupling agent layer on polyurethane basis to a second layer or ply, in particular on polydiene basis, which layer is preferably at least essentially free of polyurethane. According to the invention, it is provided that the coupling agent layer is formed of a polyenol polyurethane whose polyenol component in a manner known per se has an OH-functionality of less than 2.1, in particular of 1.7 to 2.05, preferably of 1.9 to 2.0, at preferably terminal hydroxyl groups, and/or a corresponding polyenethiol polyurethane. The invention further relates to a process for the production of the compound body and a coupling mass for performing the process.

23 Claims, No Drawings

MULTI-LAYER OR LAMINATED COMPOUND BODY, IN PARTICULAR VEHICLE TIRE, AND PROCESS AND COUPLING MASS FOR ITS PRODUCTION

The invention relates to a multi-layer or laminated compound body, in particular vehicle tire, in which at least a first layer or ply, in particular on polyurethane basis, is bonded via a coupling agent layer on polyurethane basis to a second layer or ply, in particular on polydiene basis, which layer is preferably at least essentially free of polyurethane, a process and a coupling agent mass for its production.

The invention particularly relates to optionally retreadable or retreaded vehicle tires, conveyor belts, driving or transmission belts or the like.

It has been known for some time that polyurethane plastics, for instance polyurethane elastomers, have excellent mechanical strength, high load-bearing capacity and optionally elasticity, but that their adhesive strength as compared to other materials does not come up to the severe requirements made of the organs of power transmission and conveying systems such as transmission belts, conveyor belts, vehicle chains, vehicle tires and the like. In comparison to conventional rubber mixtures, their adhesion, for instance on a wet road, is not adequate, so that they present safety hazards. There are many attempts known to find a solution to this problem, such as compounding a highly tear-resistant basic polyurethane material with a layer of essentially higher adhesive strength suitable for the transmission of force, for instance to the road, to a load to be conveyed or the like, consisting of a plastic material o elastomer not belonging to the polyurethane class, for instance one on polydiene basis, with the expectation that the compound material obtained should possess the combined favorable properties of plastic naterials of the polyurethane and non-polyurethane classes.

British patent specification No. 861220 describes compound bodies of polyurethane containing polyesters polyester amides on the one hand, and natural or synthetic rubber or thermoplastic resins, on the other hand, produced without the use of a coupling agent by direct rolling on, melting on or other application of the polyurethane component. It was found, however, that this process does not result in the adhesion between the layers which is required for moving compound bodies subjected t flexing.

In order to assure the adhesion within such compound bodies between the layers of different plastic materials, various proposals have become known, such as, for instance, the use of adhesive mixtures containing isocyanate with alkyl nitrites or the nitrite esters of carbamic acid (U.S. patent specification No. 3939294), with aliphatic nitro compounds (U.S. patent specifications Nos. 3880808 and 3916072), with aromatic nitro compounds (U.S. patent specification No. 3880810) and with organic carboxylic acids (U.S. patent specification No. 3806486) as the respective adhesion-increasing additives. Also known is the treatment of the face to be bonded to one another with ultraviolet irradiation. European Patent Specification No. 101660 recommends the incorporation of resorcinol into a strongly adhesive rubber mixture.

For the adhesive application of e.g. sidewall elements of different colors made of plastic materials on polyurethane basis on tires on the basis of conventional polydienes, for instance those containing carbon black fillers, it has been proposed to improve the adhesive strength by adding the amine catalyst in the polyurethane mass in the form of a complex salt with inorganic salts (U.S. patent specification No. 4029730).

In order to achieve a similar object, it has been attempted to apply a reaction mixture of a polyisocyanate with a polyalkadienol of a hydroxy functionality of more than 2 up to about 3 to a conventional rubber tire (U.S. patent specification No. 3648748), this publication does not mention the problem of a further bonding with a conventional polyurethane plastic material, in particular elastomer, moreover, tire walls are subjected to essentially lower shear, wear and abrasive forces than the treads in applying the driving force of a vehicle on the road.

As practice has shown, however, all known attempts at solutions are inadequate for maintaining the adhesion between the polyurethane plastic material mass and the polymer different from this, for instance a conventional synthetic rubber, at a value at which the bonding of the different layers can withstand the particularly high shear and tearing forces and the wear stress such as it occurs in industrial conveyor belts, for instance in mining or the fast turning or heavy vehicle tires, for extended periods of time.

The problem thus consisted in providing a compound material for shaped bodies, in particular the belts and tires or the like previously mentioned, with at least one component of the compound material consisting of a polyurethane plastic material, which compound material is free of the disadvantages previously mentioned and whose adhesive strength between the layers, plies, partial bodies or the like of which it is composed withstands the highest possible stress.

One object of the invention is thus a compound material or shaped body including it, preferably an optionally retreadable or retreaded vehicle tire, conveyor belt, transmission belt or the like, comprising a coupling agent layer on the basis of at least one isocyanate and polyol bonded preferably tabularly to a layer or body comprising or consisting of plastic material, preferably elastomer, in particular rubber or India rubber, on polyurethane basis, optionally containing fillers, additives and/or reinforcing agents, preferably to a thus formed body supporting body of a tire, conveyor belt, transmission belt or the like, which coupling layer is in turn, preferably also tabularly, bonded to a layer or body comprising or consisting of a polymer, preferably elastomer, different from polyurethane, in particular synthetic or natural rubber on polydiene basis optionally containing fillers, additives and/or reinforcing agents, preferably to a wear or adhesive layer or body of a tire, conveyor belt, transmission belt or the like formed thereof.

The compound body according to the invention for the solution of the problem aentioned above is characterized in particular in that the coupling agent layer consists of a polyenol polyurethane whose polyenol component in a manner known per se has a OH-functionality of less than 2.1, in particular 1.7 to 2.05, preferably 1.9 to 2.0, at preferably terminal hydroxyl groups, and/or a corresponding polyenethiol polyurethane.

The process according to the invention for the production of a compound body of this type, in particular for the production or retreading of vehicle tires, in which at least a first layer or ply, in particular on polyurethane basis is bonded via a coupling agent layer on polyurethane basis to a second layer or ply, in particular on polydiene basis, which layer is preferably at least essentially free of polyurethane, is characterized above all in that a coupling agent mixture containing at least one polyenol or polyenethiol with a known OH-functionality of less than 2.1, in particular of 1.7 to 2.05, preferably 1.9 to 2.0, as well as at least one polyisocyanate, in particular a diisocyanate, and preferably a crosslinking agent and/or chain extender is applied to the surface of the first layer or ply, preferably on polyurethane basis, to be bonded, the polyenol/isocyanate component preferably being present in the form of known polyenol isocyanate prepolymer, and that the second, optionally crosslinkable, preferably polyurethane-free layer or ply to be bonded, in particular an India rubber or rubber on polydiene basis, is applied to the coupling agent layer optionally after tempering and/or roughing of its surface and that the compound body thus obtained is subjected to a curing operation, in particular at temperatures of less than 100° C.

The coupling agent layer optionally containing reinforcing agents which is bonded with high adhesive strength to the layer or body comprising or consisting of a plastic material, preferably elastoaer, on the basis of polyurethane and is preferably in turn bonded with high adhesive strength to a further layer or body comprising or consisting of a polymer, in particular elastomer, on the basis of a polydiene, can thus be formed of an optionally molecularly cross-linked, in particular pre- or finally vulcanized mixture optionally containing fillers and/or additives with at least one polyene isocyanate, preferably polyene isocyanate prepolymer, with at least one polyene(thi)ol, preferably a hydroxy-(SH)-terminated polyene(thi)ol having anOH-(SH)-functionality of less than 2.1, in particular of 1.7 to 2.05, preferably of 1.9 to 2.0, and at least one polyisocyanate, in particular diisocyanate, as well as preferably at least one vulcanizing agent and/or chain extender, preferably on amine basis.

It was surprisingly found in the course of investigations aiming at increasing the adhesive strength between the layers that the use of a polyenol having a hydroxyl functionality within the range mentioned in a coupling agent layer on isocyanate basis brings about an unexpectedly high increase of the adhesive strength between the polyurethane and non-polyurethane plastic materials which is multiple of the adhesive strength obtainable by means of polyenols having an OH-(SH)-functionality of more than 2.1. Polyurethane plastic materials are understood to mean poly(thio)ether urethanes and/or poly(thio)ester urethanes, optionally also polyureas.The OH-groups in the poly(en)ols of the basic and/or adhesive layer can thus, as already mentioned, be at least partially replaced by SH- or $NH_2$- groups.

A process for the production of polydiene polyurethanes of a crosslinking density of $\leq 4.10^{-5} mol.cm^{-3}$ in which polydiene glycols having a functionality of 1.8 to 2.1 are used is disclosed in German Offenlegungsschrift No. 26 40 645. The ultimate tensile strength of these products is emphasized, also their application, e.g., as tire treads, conveyor belts and transmission belts.

According to the invention, the polyenol polyurethanes, e.g. of this type, are used as coupling agent layer or coupling agent mass for the formation of compound bodies and surprisingly show high adhesive strength in addition to high compounding strength.

If, as provided according to the invention, the shaped body is provided with only the new coupling agent layer, for instance in the prepolymer or precopolymer state, on a polyurethane basic body, this provides a crude tire already prepared for retreading on whose coupling agent layer the treads body is applied and the whole unit can then be finally vulcanized e.g. in an appropriate form tool. The operation is correspondingly carried out in repair work or new coating of conveyor belts or the like. If the OH-functionality of the poly(di)enol of the coupling agent layer is less than 2.1 an auto-cross-linking of the isocyanate increasing the strength and rigidity sets in. It is preferred to carry out cold vulcanizing of the rubber or India rubber layer, the temperature strees should be kept low.

It was found that the new materials can be subjected to high traction, shear and tear forces if coupling layer is formed in a convenient aanner with a prepolymer with at least one hydroxy-terminated polymer of optionally alkyl- or halogen-substituted 1,3-diene-hydrocarbons with 4 to 8, preferably 4 to 6, C-atoms, and/or a copolymer of such 1,3-diene-hydrocarbons with acrylates or styrene and polyisocyanates, in particular diisocyanates. Examples are isoprene and chloroprene.

A low technology of low cost consists in a favorable variant of embodiment providing that the coupling agent layer is formed with a prepolymer of hydroxy-terminated 1,3-butadiene and/or isoprene or chloroprene of the functionality values mentioned and polyisocyanates, in particular diisocyanates.

As far as the isocyanate moiety of the coupling agent layer of the new compound material is concerned, it is preferred to form the prepolymer or precopolymer of the coupling agent layer with 1,6-hexamethylene isocyanate, 4,4'-methylene-bis (cyclohexyl isocyanate), 2,4- and/or 2,6-toluylene diisocyanate, bis-toluylene diisocyanate, m-phenylene and p-phenylene diisocyanate, optionally hydrogenated diphenyl methane4,4'-diisocyanate, isophorone diisocyanate and/or naphthylidene diisocyanate, preferably with 2,4-toluylene diisocyanate.

It was found particularly favorable for the transfer of adhesive strength from the polyurethane plastic material or elastomer to the polydiene plastic material or elastoaer if the prepolymer or precopolymer of the coupling agent layer contains at least one OH-(SH)-terminated polyenol with a functionality of less than 2.1, in particular of 1.9 to 2.o, and at least one diisocyanate in a molar ratio of 1:1 to 1:1.20, preferably about 1:1.10.

If, according to a further embodiment, the prepolymer or precopolymer of the coupling agent layer, in particular polyalkadiene isocyanate, preferably polybutadiene isocyanate, contains 2 to 5 percent, preferably about 3 percent, of free NCO-groups, the coupling agent layer can be vulcanized together with the outer layers to obtain an essentially increased adhesive strength.

Examples of the vulcanizing agents and/or chain extenders on amine basis are 3,5-diamino-4-chloro-benzoic acid-(sec)-butyl ester and 3,3'-dichloro-4,4'-diamino diphenyl methane(moca) or its diethyl derivative.

The production of the new compound materials or the shaped bodies made thereof, in particular vehicle tires, is not bound to the sequence of steps described. It can be changed to suit any particular purpose. So, for instance, it is possible to inject into a mold on whose inner wall the prevulcanized tread rubber is placed abuttingly and covered by the starting mixture of the coupling agent, the polyurethane mass of the tire body after pretempering, whereupon, optionally immediately, the final vulcanizing and curing to the finished tire is effected. Simultaneous injection molding of two layers in on mold is also possible. The molecular weights of the polyol containing olefinic double bonds employed in the coupling agent layer mixtures conveniently range from about 1000 to about 10000.

A blank onto which a non-polyurethane layer, for instance the tread body of a tire, is to be vulcanized wIth high adhesive strength, can conveniently be obtained in a process providing to form a shaped body by spreading or covering the inner surface of a mold with a layer of a homogenized mixture of a polyene isocyanate prepolymer with at least one polyenol, preferably a hydroxy-terminated polyenol, of an OH-functionality of less than 2.1, in particular 1.7 to 2.05, preferably 1.9 to 2.0, and at least one polyisocyanate, in particular diisocyanate, as well as preferably at least one vulcanizing agent and/or chain extender, preferably on amine basis, and treating it on its exposed side by contacting by means of, for instance injection molding, a polyisocyanate preferably still containing free isocyanate groups, for instance on the basis of linear polycaprolactone polyol and 2,4-toluylene diisocyanate and if necessary post-treating, for instance tempering it.

Essentially similar effects as for the various, previously described variants of the compound materials according to the invention and the shaped bodies made thereof by the two production processes previously described can be obtained by employing the previously mentioned preferred prepolymers, polyenols, polyisocyanates, amines and the like.

A further, essential object of the invention is the new coupling mass used for forming the new, previously described compound materials and shaped bodies nade thereof. In order to avoid unnecessary repetitions, it is stated that said aass is characterized in that it is formed, optionally containing fillers and/or additives, with at least one polyene(thi)ol, preferably an OH-(SH)-terminated polyenol, in particular one containing conjugated double bonds, preferably 1,3-diene bonds, of a functionality of less than 2.1, in particular 1.7 to 2.05, preferably 1.9 to 2.0, and at least one polyisocyanate, in particular diisocyanate, as well as preferably at least one vulcanizing agent and/or chain extender, preferably on amine basis, according to one of the variants described previously in detail and with indication of effects.

The invention is explained in detail by means of the following example allowing a comparison.

EXAMPLE 560 g (o.2 mol) of a hydroxy-terminated polybutadiene (OH-number 46,6, functionality about 2.3) are freed of moisture by heating to 100° C. under reduced pressure for one hour, then cooled to 80° C., then 76.6 g ( 0.22 mol) of 2,4-toluylene diisocyanate are added. The mixture is agitated at 80° C. for two hours. The result is a clear, viscous polybutadiene isocyanate with a content of 3.0 percent of free NCO-groups. 200 parts by weight of the polybutadiene isocyanate are intimately mixed with 15.6 parts of molten 3,5-diamino-4-chloro-benzoic acid-(sec)-butyl ester and this mixture is spread on the inside of a teflonized mold. A polycaprolactone isocyanate with a content of 3.57 percent of free NCO-groups, prepared in a conventional manner by means of 500 parts by weight of linear polycaprolactone polyol (OH-number 56, molecular weight 2000) and 87.1 parts by weight of 2,4-toluylene diisocyanate intimately mixed with 3,5-diamino-4-chloro-benzoic acid-(sec) butyl ester in a ratio of 100:9.7 was poured onto the still uncured surface. Removal from the mold can be effected after 30 minutes. The is tempered for five hours at 100° C., stored at room temperature for two days, then the polybutadiene polyurethane layer is slightly roughed, partially covered and vulcanized in the conventional manner of cold retreading of vehicle tires with prevulcanized tread rubber a 98° C. for four hours. The result is the compound material 1.

If the previously described production process is carried out according to the invention by replacing the hydroxy-terminated polybutadiene of the OH-functionality of 2.3 by a equivalent amount of one of a functionality of 1.98, 1.95, 1.85, 1.7, the otherwise identical process yields the compound materials 2 to 5.

Test Results

Samples of the dimensions 2×12 cm are punched out from the compound materials 1 to 5, heated to 70° C. and their adhesive strength in N/cm is tested at this temperature.

| Compound Material No. | Adhesive Strength in N/cm |
| --- | --- |
| 1 | 10 |
| 2 | 47 |
| 3 | 52 |
| 4 | 38 |
| 5 | 31 |

It is evident from this comparison that the adhesive strength of the compound materials 2 to 5 is a multiple of that of the compound material 1.

We claim:

1. In a multi-layer compound body in which at least a first layer comprising a polyurethane is bonded via a coupling agent layer to a second layer comprising a polydiene, which second layer is essentially free of polyurethane, the improvement comprising said coupling agent comprising a polyurethane, which is the reaction product of an isocyanate with a polyene component selected from the group consisting of polyenol and polyenethiol, said polyene component having a hydroxyl functionality of less than 2.1 at terminal positions.

2. The compound body according to claim 1, wherein the polyene grouping of the polyene component is selected from the group consisting of an alkyl- or halogen-substituted 1,3-diene-hydrocarbon copolymer having 4 to 8 C-atoms, alkyl- or halogen-substituted 1,3-diene-hydrocarbon copolymer with acrylates, alkyl- or halogen-substituted 1,3-diene-hydrocarbon copolymer with styrene, chloroprene and isoprene.

3. The compound body according to claim 1, wherein the isocyanate is selected from the group consisting of 1,6-hexamethylene isocyantate, 4,4'-methylene-bis(cyclohexyl isocyanate), 2,4-toluylene diisocyanate, 2,6-toluylene diisocyanate, bistoluylene diisocyanate, m-phenylene diisocyanate, p-phenylene diisocyanate, naphthylidene diisocyanate, diphenyl methane-4,4'-diisocyanate, hydrogenated diphenyl methane-4,4'-diisocyanate and isophorone diisocyanate.

4. The compound body according to claim 1, wherein the polyurethane of the coupling agent layer is present in a polyene/isocyanate molar ratio of about 1:1 to about 1:1.20.

5. The compound body according to claim 1, wherein the hydroxyl functionally of the coupling agent is about 1.7 to about 2.05.

6. The compound body according to claim 1, wherein the polyene grouping of the polyenol is poly-1,3,butadiene.

7. The compound body according to claim 1, wherein the isocyanate is 2,4-toluylene diisocyanate.

8. The compound body according to claim 4, wherein polyenol and isocyanate are present in a molar ratio of about 1:1.10.

9. In a process for the production of a multi-layer compound body in which at least a first layer is bonded via a coupling agent layer to a second layer comprising a polydiene, which second layer is essentially free of polyurethane, the improvement comprising the steps of applying a coupling agent, said coupling agent being selected from the group consisting of polyenol and polyenethiol having a hydroxyl functionality of less than 2.1, an isocyanate, a cross-linking agent and a chain extender, to the surface of the first layer, tempering the surface of the first layer, applying said second layer and subjecting the compound body thus obtained to curing at temperature of less than about 100° C.

10. The process according to claim 9, wherein said polyene component is selected from the group consisting of alkyl-or halogen-substituted 1,3-diene-hydrocarbon polymer with 4 to 8 C-atoms, alkyl- or halogen-substituted 1,3-diene-hydrocarbon copolymer with acrylates, alkyl- or halogen-substituted 1,3-diene-hydrocarbon copolymer with styrene, chloroprene and isoprene.

11. The process according to claim 9, wherein the isocyanate component of the coupling agent mixture is selected from the group cosisting of 1,6-hexamethylene isocyanate, 4,4'-methylene-bis (cyclohexyl isocyanate), 2,4-toluylene diisocyanate, 2,6-toluylene diisocyanate, bistoluylene diisocyanate, 12. The process according to claim 9, wherein the polyene component and the isocyanate component in the coupling agent mass are employed in a molar ratio of about 1:1 to about 1:1.20.

13. The process according to claim 9, wherein a polyenol isocyanate prepolymer having about 2 percent to about 5 percent free NCO-groups is employed in the coupling agent.

14. The process according to claim 9, wherein the process is used for the production of vehicle tires.

15. The process according to claim 9, wherein the process is used for retreading vehicle tires.

16. The process according to claim 9, wherein the hydroxyl functionality of the coupling agent is about 1.7 to about 2.05.

17. The process according to claim 9, wherein the hydroxy functionality of the coupling agent is about 1.9 to about 2.0.

18. The process according to claim 9, wherein the isocyanate is a diisocyanate.

19. The process according to claim 9, wherein the isocyanate is 2,4-toluylene diisocyanate.

20. The process according to claim 9, wherein polyene and isocyanate are present in the form of a polyene/isocyanate prepolymer.

21. The process according to claim 9, wherein the polyene grouping of the polyenol is 1,3-butadiene.

22. The process according to claim 9, wherein polyene and isocyanate are present in a molar ratio of about 1:1.10.

23. The process according to claim 12, wherein the polyene isocyanate prepolymer has about 3 percent free NCO-groups.

* * * * *